(12) United States Patent
Glohr et al.

(10) Patent No.: US 8,866,335 B2
(45) Date of Patent: Oct. 21, 2014

(54) CONTROL CONCEPT FOR LIMIT-VALUE MANAGEMENT FOR DC/DC CONVERTER IN AN ENERGY SYSTEM

(75) Inventors: Francis Glohr, Haguenau (FR); Arthur Schaefert, Buehlertal (DE); Thomas Schneider, Bad Koenigshofen (DE)

(73) Assignee: Robert Bosch GmbH, Stuttgart (DE)

( * ) Notice: Subject to any disclaimer, the term of this patent is extended or adjusted under 35 U.S.C. 154(b) by 911 days.

(21) Appl. No.: 13/025,579

(22) Filed: Feb. 11, 2011

(65) Prior Publication Data
US 2011/0193410 A1 Aug. 11, 2011

(30) Foreign Application Priority Data

Feb. 11, 2010 (DE) .......................... 10 2010 001 817

(51) Int. Cl.
| | |
|---|---|
| H02J 1/10 | (2006.01) |
| H02J 3/46 | (2006.01) |
| B60L 11/18 | (2006.01) |
| H02J 7/34 | (2006.01) |
| H02J 7/00 | (2006.01) |
| H02M 1/32 | (2007.01) |
| B60L 11/00 | (2006.01) |

(52) U.S. Cl.
CPC ................ *H02J 7/34* (2013.01); *Y02T 10/705* (2013.01); *B60L 11/1862* (2013.01); *B60L 2260/54* (2013.01); *Y02T 10/7022* (2013.01); *H02J 7/0065* (2013.01); *B60L 11/1887* (2013.01); *H02M 1/32* (2013.01); *Y02T 10/7044* (2013.01); *Y02T 10/7216* (2013.01); *B60L 2210/10* (2013.01); *B60L 11/1894* (2013.01); *B60L 11/005* (2013.01); *B60L 11/1851* (2013.01); *Y02T 90/34* (2013.01); *H02J 7/0029* (2013.01)
USPC .......................................................... 307/24

(58) Field of Classification Search
CPC ..................................... H02J 7/00; H02J 13/00
USPC .......................................................... 307/24
See application file for complete search history.

(56) References Cited

U.S. PATENT DOCUMENTS

| | | | | |
|---|---|---|---|---|
| 7,843,185 | B2* | 11/2010 | Berry et al. | 323/283 |
| 7,952,224 | B2* | 5/2011 | Sawada et al. | 307/9.1 |
| 8,620,503 | B2* | 12/2013 | Ito et al. | 701/22 |
| 2003/0107352 | A1* | 6/2003 | Downer et al. | 322/40 |
| 2009/0271642 | A1* | 10/2009 | Cheng et al. | 713/300 |

FOREIGN PATENT DOCUMENTS

| | | |
|---|---|---|
| DE | 19617548 | 11/1997 |
| DE | 10223117 | 12/2003 |
| DE | 102004042004 | 3/2006 |

(Continued)

*Primary Examiner* — Jared Fureman
*Assistant Examiner* — Toan Vu
(74) *Attorney, Agent, or Firm* — Michael Best & Friedrich LLP

(57) ABSTRACT

An apparatus for controlling an energy system having at least one energy unit and at least one DC/DC converter, wherein the DC/DC converter is coupled to at least one electrical component, and a power output to the electrical component can be controlled by the DC/DC converter, with the maximum power which can be output to the electrical component being determined by a power limit value of the DC/DC converter. The invention provides that the energy unit and the DC/DC converter and the electrical component are coupled via a limit-value management system which controls the power output such that, when power is demanded from the electrical component above the power limit value of the DC/DC converter, power is output up to the maximum power limit value.

19 Claims, 2 Drawing Sheets

(56) References Cited

FOREIGN PATENT DOCUMENTS

| | | |
|---|---|---|
| DE | 102005052782 | 5/2007 |
| DE | 102009013175 | 11/2009 |
| IT | EP1333562 | * 8/2003 |

* cited by examiner

CONTROL CONCEPT FOR LIMIT-VALUE MANAGEMENT FOR DC/DC CONVERTER IN AN ENERGY SYSTEM

BACKGROUND OF THE INVENTION

The invention relates to an apparatus for controlling an energy system having at least one energy unit and at least one DC/DC converter, wherein the DC/DC converter is coupled to at least one electrical component, and a power output to the electrical component can be controlled by the DC/DC converter, with the maximum power which can be output to the electrical component being determined by a power limit value of the DC/DC converter. The invention also relates to a method for controlling an energy system having at least one energy unit and at least one DC/DC converter, wherein the DC/DC converter is coupled to at least one electrical component, and a power output to the electrical component can be controlled by the DC/DC converter, with the maximum power which can be output to the electrical component being determined by a power limit value of the DC/DC converter.

DE 102 23 117 A1 discloses energy systems being formed from a plurality of sub-components. The power response of the individual components in this case influences the entire method of operation of the energy system. In this case, DC/DC converters are used, inter alia, to control power outputs to electrical components, in which case a specific power limit must not be exceeded for the DC/DC converter. The maximum power which can be output to the electrical component, which may be an electrical drive for a motor vehicle, is accordingly limited by the power limit of the DC/DC converter. Further additional electrical components connected to the DC/DC converter, such as electrical loads, reduce the maximum power which can be output to the electrical drive. The optimum availability of the electrical drive is thus reduced. Furthermore, it is possible that a power demand to the electrical component above the power limit of the DC/DC converter could result in the latter being damaged.

SUMMARY OF THE INVENTION

The object of the present invention is to increase the availability of the electrical component in order in this way to ensure optimum operational availability of the electrical component, and to protect the DC/DC converter against damage.

The invention provides that the energy unit and the DC/DC converter and the electrical component are coupled via a limit-value management system which controls the power output such that, when power is demanded from the electrical component above the power limit value of the DC/DC converter, power is output up to the maximum power limit value.

The essence of the invention is that, if a power limit value is possibly exceeded in an energy system, the power budget is controlled such that the power limit value can be complied with. For this purpose, the sub-components of the energy system are coupled to an energy management system, thus allowing continuous monitoring of the individual sub-components. In a situation in which the power limit value has possibly been exceeded the energy management system can control the power output such that it is below the maximum power limit.

It is particularly advantageous that a first energy unit and a second energy unit are coupled to one another, with the first energy unit being coupled to a first DC/DC converter and with the second energy unit being coupled to a second DC/DC converter, with the first DC/DC converter and the second DC/DC converter being connected in parallel, thus making it possible to achieve an increase in the possible power output to the electrical component. If the power limit value of the first DC/DC converter is possibly exceeded, this makes it possible to increase the power for the second DC/DC converter such that the desired power to be output to the electrical component can be achieved. Furthermore, power adjustment between the first and the second energy units is feasible. In addition, the fail-safety can be improved by means of a plurality of energy units.

It is furthermore advantageous that the DC/DC converter has at least one control element such that the DC/DC converter can be operated on a current-controlled or voltage-controlled basis. These control elements can be implemented using traditional control engineering, status control, fuzzy logic or using other embodiments. Furthermore, it is feasible to be able to design the control elements to be controlled on a power or temperature basis. Cascaded control elements are also feasible, which can control a plurality of variables simultaneously. It is also feasible to use control elements which can represent a combination of different control-engineering principles. In this case, a control concept is feasible in which a plurality of control elements are used in order to make it possible to implement a specific energy management strategy in the energy system. Cascade control allows the overall controlled section to be subdivided into relatively small sub-sections, which can be controlled better. This improves the control accuracy in comparison to a directly acting control element. In this case, the power switching capability of each control element is limited on a mathematical/technical basis and on a technical/physical basis. By way of example, a boost converter or Buck converter can be operated only with a duty ratio between 0 and 100%. The technically physical limit corresponds to the power capability of the physical path, and is at the same time used to protect the physical path itself. A DC/DC converter is therefore designed for a specific current-carrying capability, and the components are allocated to a specific voltage class. The regulator output should therefore be limited in order to protect the hardware of the DC/DC converter. Furthermore, specific required limits at the input and output must be complied with in the DC/DC converter. If the limit values are exceeded, the regulator can no longer carry out its function of controlling the nominal value. An energy management strategy can thus be configured such that, if the control element limit values are exceeded, the limit-value management system controls the control elements in the energy system with an existing residual capacity such that the sub-components with a high operating priority in the energy system are supplied with energy as a priority. This can also be done by switching off and/or reducing the energy supply to sub-components, which may be considered to be necessary by the limit-value management system if limit values of all the control elements are exceeded. Furthermore, it is feasible for the limit-value management system to be able to shift the load point of one or more energy units, in order to allow efficiency optimization of the energy system.

It is advantageous that the first energy unit and/or the second energy unit are/is a fuel cell and/or an energy store, in particular a capacitor, an ELDC (electrochemical double layer capacitor) or a rechargeable battery. A hybrid energy system is therefore feasible for the electrical supply of a traction drive and for loads in a fuel-cell vehicle. In the case of this hybrid energy system, power can therefore be interchanged between the energy sources and the loads via the DC/DC converter. Because of the high energy density which the energy stores have, it is even possible to operate electrical components which have high power demands. Furthermore, briefly required power peaks for the electrical component can be coped with. Since the electrical component may be an electric motor and/or a generator or a combined generator-motor unit, the energy produced by the generator can be supplied to the energy stores again. This allows the energy system to be used in a motor vehicle.

It is furthermore advantageous for the electrical component to be an electric motor and/or generator. Use of the energy system is therefore likewise feasible in a motor vehicle. An electric motor which is coupled as a drive to a first axle of the motor vehicle can thus drive the motor vehicle. Furthermore, it is possible to fit a generator to the second axle of the motor vehicle, which feeds back excess consumed energy via the DC/DC converter to an energy store, which can be coupled to the energy system. It is furthermore feasible for recuperation energy, for example braking energy in a motor vehicle, to be supplied to the energy store again for storage.

It is particularly advantageous that the limit-value management system has an efficiency-optimized energy management strategy with traction on-board power supply system limit-value management, with the traction on-board power supply system limit-value management comprising an energy unit limit-value management, control element limit-value management and/or electrical component limit-value management, in particular in that the energy unit limit-value management is connected to the energy unit and the control element limit-value management is connected to the DC/DC converter, and the electrical component limit-value management is connected to the electrical component. The traction on-board power supply system limit-value management, energy unit limit-value management, control element limit-value management and electrical component limit-value management ensure the coordination of the DC/DC converter and fraction on-board power supply system components. These blocks can coordinate the control systems for the DC/DC converters, can likewise limit the traction on-board power supply system loads, and can coordinate the interests of the energy units with those of the traction on-board power supply system. A traction on-board power supply system may in this case be formed from two DC/DC converters, which are each coupled to one energy unit, ensuring an electrical drive by being connected in parallel. In this case, the energy units may consist of a fuel cell and an energy store. In addition to these blocks, which coordinate the DC/DC control systems and the limit values of the traction on-board power supply system components, there may also be a function block which takes care of an efficiency-optimized energy management strategy. This strategy can in general be implemented in the traction on-board power supply system. In the case of active limit-value management, it may be necessary to leave this strategy, in order to protect components or to achieve other aims. The energy unit limit-value management may in this case take account of and coordinate the limit values of the energy units, with values such as powers, currents, voltages and/or values of the state of charge SOC of the energy units being registered by the energy unit limit-value management. By way of example, in the case of a demand to charge an energy store which has a low SOC, the energy unit limit-value management can thus pass on a charging request to the fuel cell. The control element limit-value management takes account of and coordinates the limit values and nominal values for the DC/DC converters, when the control element limit-value management identifies that a current or voltage limit value of a DC/DC converter has been reached, allowing the actual task to be carried out by the DC/DC converter to be transferred to another DC/DC converter in the energy system. Furthermore, the DC/DC converter which is coupled to the energy store in the hybrid energy system can control the voltage in the energy system, in which case the DC/DC converter which is coupled to the fuel cell can control the current. In the situation in which the DC/DC converter which is coupled to the energy unit has reached its power limit, the DC/DC converter which is coupled to the fuel cell can take over the task of controlling the voltage in the energy system, by means of the control element limit-value management. The electrical component limit-value management can in this case limit, reduce or switch off the energy for specific sub-components in the energy system, in accordance with specific rules. In this case, it is feasible when the hybrid energy system is used in a motor vehicle to allow a specific total power to be drawn from the hybrid energy system as a function of the vehicle speed, temperature or in general the status of the energy units. If the total power is possibly exceeded, the electrical component limit-value management can then carry out a prioritization process, thus making it possible to limit, reduce or switch off the energy to the sub-components in the energy system, in accordance with the prioritization. The traction on-board power supply system limit-value management coordinates the energy unit limit-value management, the electrical component limit-value management and the control element limit-value management, and ensures intelligent data interchange between the management components. In this case, available powers, currents or voltages can be transferred from the energy unit limit-value management to the electrical component limit-value management and/or the control element limit-value management, in which case the electrical component limit-value management can signal power demands to the traction on-board power supply system limit-value management, the control element limit-value management and/or the energy unit limit-value management. In this case, the main task of the traction on-board power supply system limit-value management is to ensure the availability of the sub-components in the energy system, and to keep the power budget of the energy system in a defined range. The efficiency-optimized energy management strategy in this case comprises maintenance of the maximum efficiency of the energy system, taking account of the individual efficiencies of all the sub-components.

The object according to the invention is likewise achieved by a method for controlling an energy system having at least one energy unit and at least one DC/DC converter, wherein the DC/DC converter is coupled to at least one electrical component, and a power output to the electrical component can be controlled by the DC/DC converter, with the maximum power which can be output to the electrical component being determined by a power limit value of the DC/DC converter. To this end, the invention provides that the energy unit and the DC/DC converter and the electrical component are coupled via an energy management system which controls the power output such that, when power is demanded from the electrical component above the power limit value of the DC/DC converter, power is output up to the maximum power limit value.

It is particularly advantageous that, if the power limit value of the DC/DC converter is exceeded, the latter signals an item of information to the energy management system via an interface, as a result of which an appropriate countermeasure is initiated in order to comply with the limit value, with an energy unit limit-value management and/or control element limit-value management and/or electrical component limit-value management being carried out. This allows the limit-value management to operate in a plurality of stages. In the first stage, the energy system operates within the intended power limits. The energy management strategy, which is predetermined by the energy system, is implemented in this case. In this case, a balanced power budget is ensured in the energy system, that is to say the electrical component which a traction drive and/or further loads may have is limited to the electrical power available in the energy system. In this case, depending on the energy management strategy, the total required power may be demanded and called up by the energy units, or only a limited amount of power may be made available. In this case, lower limits may be implemented by the energy unit limit-value management, the control element limit-value management or the electrical component limit-value management, in which case low priorities can be given to the traction on-board power supply system limit-value management. Furthermore, the power consumption of the components can be reduced by the electrical component limit-value management. In addition, it is feasible for an energy unit, which may be an energy store, to transmit charge or discharge information to the energy unit limit-value management, in which case a further energy unit, which can likewise be connected to the energy unit limit-value management, receives information about the required nominal power via the traction on-board power supply system limit-value management. A short-term minimum current limit for an energy unit which is coupled to the control element limit-value management via a DC/DC converter may in this case be adopted by a second energy unit, which is likewise coupled to the control element limit-value management via a further DC/DC converter. In the second stage, the DC/DC converter signals in the event of active limiting or exceeding of a limit value, with this information being transmitted to the energy management limit-value system, in response to which, in the control element limit-value management, the DC/DC converter controls the electrical component power consumption below the power limit value. In this case, the control element limit-value management can send problems relating to the power output and power increase to the electrical component limit-value management, in which case the power consumption or the consumption of recuperation power can be limited by the electrical component limit-value management. In the third stage, when active limiting of the DC/DC converter or the exceeding of a limit value is signaled, control of the power consumption can no longer be solved solely by controlling the control elements in the DC/DC converter. In this case, the energy unit limit-value management and/or the electrical component limit-value management are/is also included in the energy management strategy. This allows the power consumption of the electrical component to be additionally limited, or the power demand to the energy unit to be additionally increased. It is also feasible for the voltage control task to be carried out by another DC/DC converter, which is coupled to the control element limit-value management.

It is furthermore advantageous for the user of the energy system to be notified if the power limit value of the DC/DC converter is exceeded. This allows the user to intervene actively in the energy management, since he can manually restrict the power demanded by the electrical component, in order to prevent the limit value from being exceeded.

BRIEF DESCRIPTION OF THE DRAWINGS

Further measures and advantages of the invention will become evident from the claims, the following description and the drawings. A plurality of exemplary embodiments of the invention are illustrated in the drawings. In this case, the features mentioned in the claims and in the description are in each case essential to the invention individually in their own right, or in any desired combination. In the figures:

DETAILED DESCRIPTION

Figure 1:
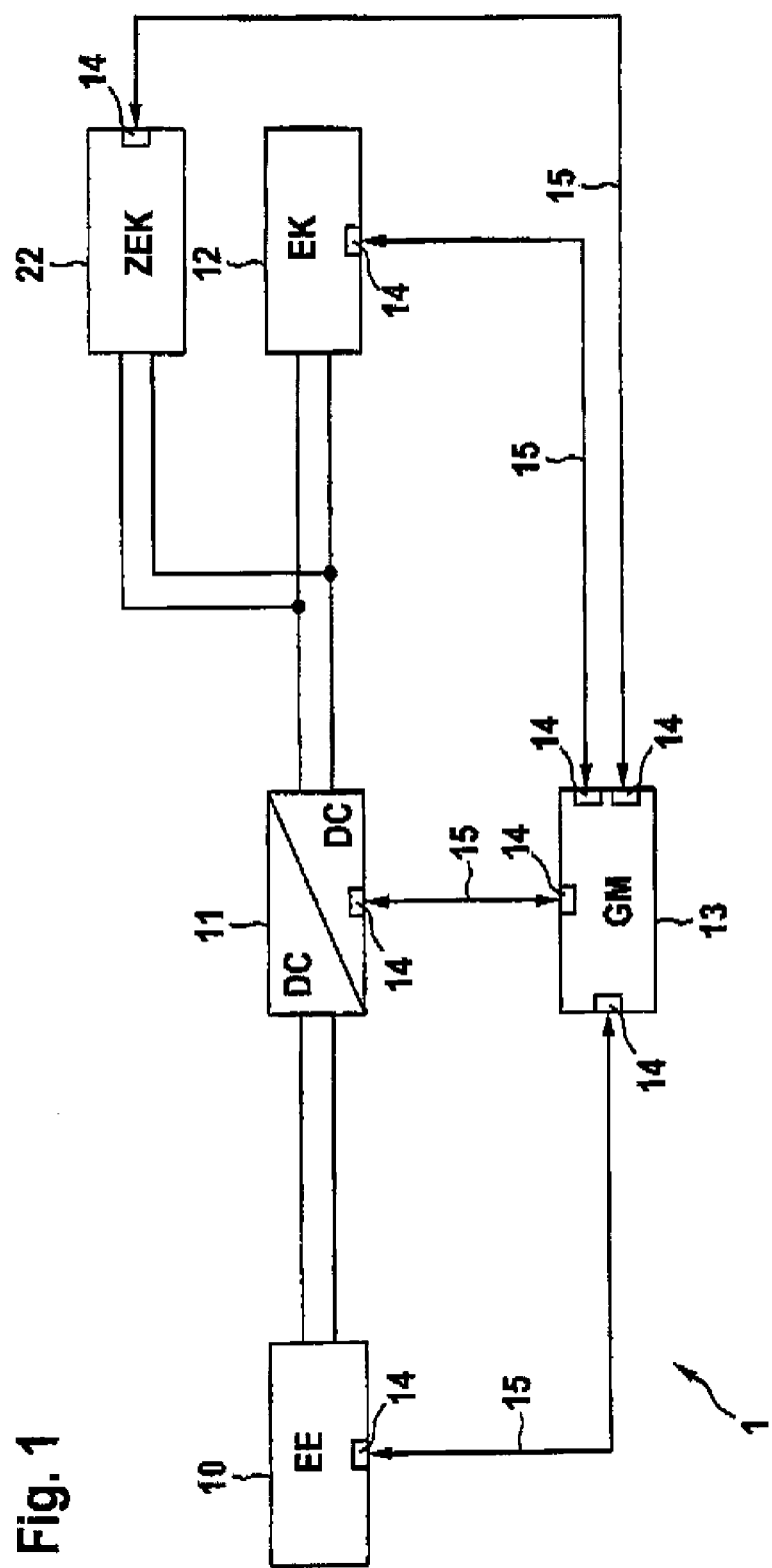
FIG. 1 shows a schematic view of an energy management limit-value system with an electrical component.

FIG. 1 schematically illustrates an energy system 1 in which an energy unit 10 is electrically connected to a DC/DC converter 11. An electrical component 12 is arranged at the output of the DC/DC converter 11. A second electrical component 22 is connected in parallel at the output of the DC/DC converter 11. The energy unit 10 has an interface 14 which is coupled via an information channel 15 to an interface 14 of a limit-value management system 13. The DC/DC converter 11 is also connected by an interface 14, via an information channel 15, to the limit-value management system 13 via an interface 14. Furthermore, the electrical component 12, which likewise has an interface 14, and the second electrical component 22, which also has an interface 14, are connected to one another by means of the limit-value management system 13 via a respective interface 14. Signals can be interchanged via the information channels 15 between the individual components, by means of the limit-value management system 13. This may be information relating to actual values, limit values and nominal values of the individual components. Via the information channel 15, the limit-value management system 13 can cause the DC/DC converter 11 to restrict the maximum power which can be output if a limit value is exceeded. The electrical component 12 and the second electrical component 22 would be affected by this. Since the first electrical component may be a drive for a motor vehicle, this will result in the vehicle dynamics being limited. In order nevertheless to ensure that appropriate driving dynamics are available to the driver of the motor vehicle, even if the limit value of the DC/DC converter 11 is exceeded, the limit-value management system 13 can cause the second electrical component 22 to reduce the power consumption, via an information channel 15. This would therefore balance the total energy budget again. When the energy system 1 is used in a motor vehicle, the second electrical component 22 may consist of loads, for example comfort systems, in particular audio systems, navigation systems and lighting means. In this case, these loads can be switched off without any risk to the driver of the motor vehicle, if the maximum permissible power of the DC/DC converter 11 is exceeded.

Figure 2:
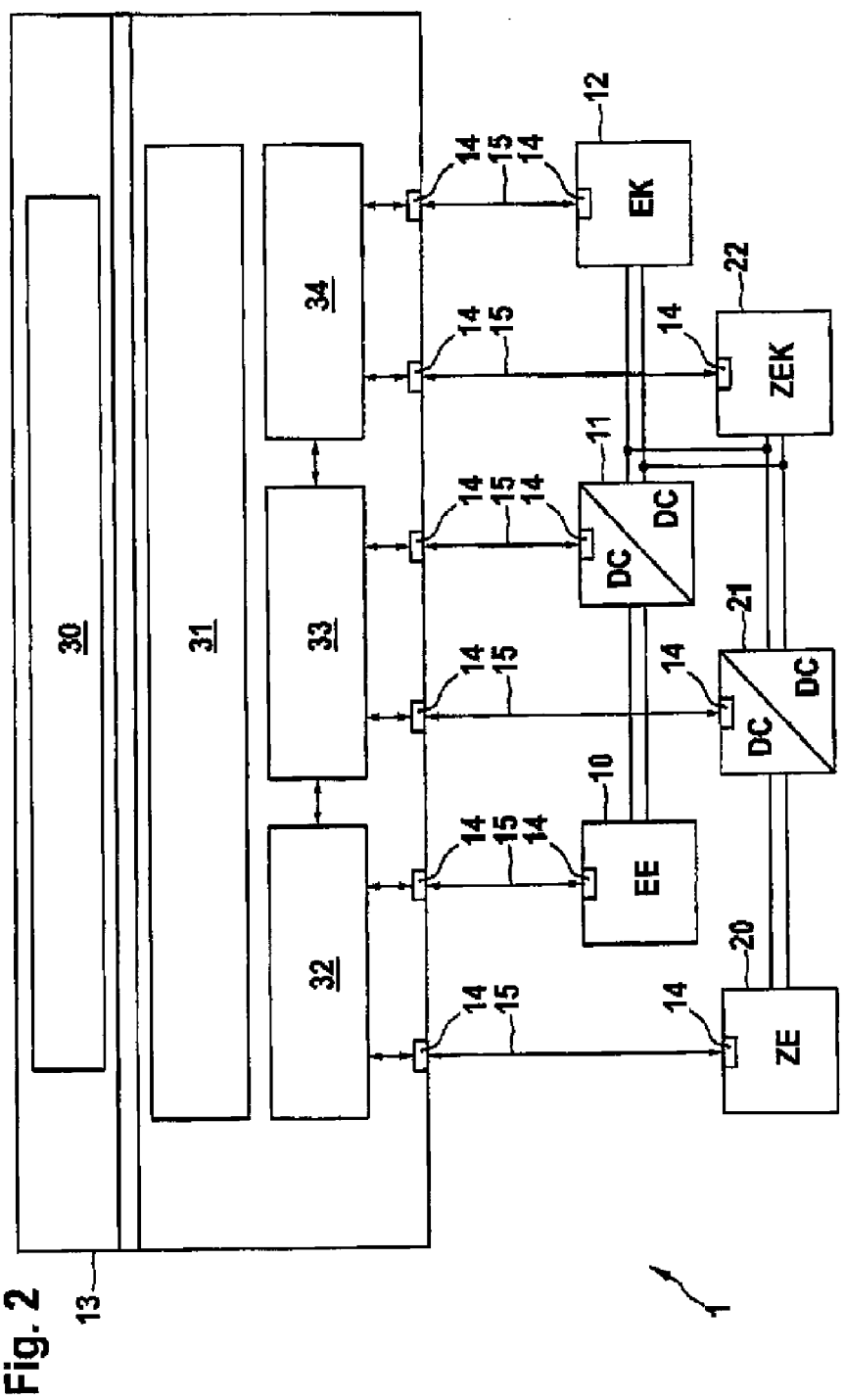
FIG. 2 shows a schematic view of an energy management limit-value system with a plurality of electrical components and the function blocks of an energy management limit-value system.

FIG. 2 schematically illustrates an energy system 1 in which a first DC/DC converter 11 is electrically connected to an energy unit 10. An electrical component 12 is likewise electrically coupled to the output of the first DC/DC converter 11. A second energy unit 20 is electrically coupled to a second DC/DC converter 21, with the output of the second DC/DC converter 21 being coupled to a second electrical component 22. In this case, the output of the first DC/DC converter 11 is connected in parallel with the output of the second DC/DC converter 21, in which case it is feasible for the DC/DC converter outputs not to be connected in parallel. The first energy unit 10, the first DC/DC converter 11, the first electrical component 12, the second energy unit 20, the second DC/DC converter 21 and the second electrical component 22 each have an interface 14, and are each connected by an interface 14 and by an information channel 15 to the limit-value management system 13. It is feasible for further energy units likewise to be connected to the limit-value management system 13, preferably in each case via a DC/DC converter. In this case, the limit-value management system 13 has various function blocks, such as an efficiency-optimized energy management strategy function 30 and a traction on-board power supply system limit-value management function 31, which has an energy unit limit-value management function 32, a control element limit-value management function 33 and an electrical component limit-value management function 34, which communicate with one another. The energy unit 10 and the second energy unit 20 transmit their information via the information channels 15 and directly via an interface 14 of the limit-value management system 13 to the energy unit limit-value management function 32. In this case, information can be transmitted by an interchange of signals. For this purpose, measured actual values, active limiting of the electrical unit and of the second electrical unit can be transmitted, such as the instantaneous voltage, the SOC (state of charge), SOH (state of health), SOF (state of function), maximum discharge power, maximum charging power, maximum charging current, maximum discharge current, energy content, instantaneous temperature, maximum permissible temperature, and other informative characteristic variables. In the situation in which the energy unit 10, 20 is a fuel cell system, signals such as power demands, information about future power demands or other information can be sent to the fuel cell system. The fuel cell system itself can send to the limit-value management system 13 signals such as the maximum possible output power, minimum power to be drawn, maximum permissible voltage, minimum permissible voltage and other information. The electrical component 12 and the second electrical component 22 can transmit a power consumption demand or a power feed demand to the limit-value management system 13. In the situation in which the electrical component 12 consists of a traction drive, information is possible relating to an actual torque, an actual rotation speed or an output of calculated values for possible drive torques and rotation speed for a consumption and/or output power that is available by way of example.

The second electrical component may in this case receive information about the maximum permissible power consumption, or a prediction of the next-possible maximum power consumption. In the situation in which the second electrical component 22 consists of loads in a motor vehicle, which are not required for the actual traction drive, this may be worthwhile. Furthermore, the driver of the motor vehicle can be informed about possible limiting of the electrical loads, such as audio systems, video systems or electrical seat heating.

The invention claimed is:

1. An apparatus for controlling an energy system (1), the apparatus comprising:
    at least one energy unit (10, 20);
    at least one DC/DC converter (11, 21), the DC/DC converter (11, 21) coupled to at least one electrical component (12, 22);
    a power output to the electrical component (12, 22) controlled by the DC/DC converter (11, 21), with the maximum power which can be output to the electrical component (12, 22) determined by a power limit value of the DC/DC converter (11, 21);
    a limit-value management system (13) coupling the energy unit (10, 20), the DC/DC converter (11, 21), and the electrical component (12, 22), the limit-value management system (13) configured to control the power output such that, when power is demanded by the electrical component (12, 22) above the power limit value of the DC/DC converter (11, 21), power is output up to the maximum power limit value.

2. The apparatus according to claim 1, characterized in that a first energy unit (10) and a second energy unit (20) are coupled to one another, with the first energy unit (10) being coupled to a first DC/DC converter (11) and with the second energy unit (20) being coupled to a second DC/DC converter (21), with the first DC/DC converter (11) and the second DC/DC converter (21) being connected in parallel, thus making it possible to achieve an increase in the possible power output to the electrical component.

3. The apparatus according to claim 1, characterized in that the DC/DC converter (11, 21) has at least one control element such that the DC/DC converter (11, 21) can be operated on a current-controlled or voltage-controlled basis.

4. The apparatus according to claim 1, characterized in that at least one of a first energy unit (10) and a second energy unit (20) are at least one of a fuel cell and an energy store.

5. The apparatus according to claim 1, characterized in that the electrical component (12, 22) is at least one of an electric motor and generator.

6. The apparatus according to claim 1, characterized in that the limit-value management system (13) has an efficiency-optimized energy management strategy function (30) with a traction on-board power supply system limit-value management function (31), the traction on-board power supply system limit-value management function (31) comprising at least one of an energy unit limit-value management function (32), a control element limit-value management (33), and/or an electrical component limit-value management function (34).

7. A method for controlling an energy system (1) having at least one energy unit (10, 20) and at least one DC/DC converter (11, 21), the method comprising:
    coupling the DC/DC converter (11, 21) to at least one electrical component (12, 22);
    controlling a power output to the electrical component (12, 22) by the DC/DC converter (11, 21);
    determining the maximum power which can be output to the electrical component (12, 22) by a power limit value of the DC/DC converter (11, 21);
    coupling, via a limit-value management system (13), the energy unit (10, 20), the DC/DC converter (11, 21), and the electrical component (12, 22);
    controlling, via the limit-value management system (13), the power output such that, when power is demanded by the electrical component (12, 22) above the power limit value of the DC/DC converter (11, 21), power is output up to the maximum power limit value.

8. The method according to claim 7, further comprising signalling, by the DC/DC converter (11,21), if the power limit value of the DC/DC converter (11, 21) is exceeded, an item of information to the limit-value management system (13) via an interface (14), initiating, as a result of the signal, an appropriate countermeasure in order to comply with the limit value, carrying out the appropriate countermeasure with an energy unit limit-value management (32) and/or control element limit-value management (33) and/or electrical component limit-value management (34).

9. The method according to claim 7, further comprising notifying a user of the energy system (1) when the power limit value of the DC/DC converter (11, 21) is exceeded.

10. The method according to claim 7 further comprising operating an apparatus via the power output.

11. The apparatus according to claim 1, characterized in that at least one of a first energy unit (10) and a second energy unit (20) is a fuel cell.

12. The apparatus according to claim 1, characterized in that at least one of a first energy unit (10) and a second energy unit (20) is an energy store.

13. The apparatus according to claim 1, characterized in that the electrical component (12, 22) is an electric motor.

14. The apparatus according to claim 1, characterized in that the electrical component (12, 22) is a generator.

15. The apparatus according to claim 1, characterized in that the limit-value management system (13) has an efficiency-optimized energy management strategy function (30) with a traction on-board power supply system limit-value management function (31), the traction on-board power supply system limit-value management function (31) comprising an energy unit limit-value management function (32).

16. The apparatus according to claim 1, characterized in that the limit-value management system (13) has an efficiency-optimized energy management strategy function (30) with a traction on-board power supply system limit-value management function (31), the traction on-board power supply system limit-value management function (31) comprising a control element limit-value management function (33).

17. The apparatus according to claim 1, characterized in that the limit-value management system (13) has an efficiency-optimized energy management strategy function (30) with a traction on-board power supply system limit-value management function (31), the traction on-board power supply system limit-value management function (31) comprising an electrical component limit-value management function (34).

18. The apparatus in according to claim 6, wherein the energy unit limit-value management (32) is connected to the energy unit (10, 20) and the control element limit-value management (33) is connected to the DC/DC converter (11, 21), and the electrical component limit-value management (34) is connected to the electrical component (12, 22).

19. The apparatus according claim 4, where in the energy store is one of a capacitor, an ELDC (electrochemical double layer capacitor) or a rechargeable battery.

* * * * *